UNITED STATES PATENT OFFICE 2,510,993

SOLUBLE SULFADIAZENE-ALKALI SALICYLATE COMPOSITIONS

Fritz Meyer, Staten Island, and Carl Neuberg, New York, N. Y.; said Neuberg assignor to said Meyer No Drawing. Application March 16, 1946, Serial No. 655,016

2 Claims. (Cl. 167—51.5)

This invention relates to compounds of sulfadiazine and salts of salicylic acid and has particular relation to compounds of this type which can be dissolved in water and yield stable, aqueous solutions adapted to be administered by injection. The invention also relates to aqueous solutions of said compounds.

Sulfadiazine is a derivative of sulfanilic acid of the formula

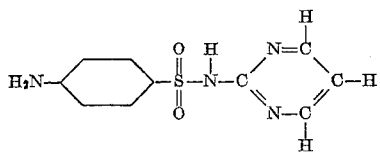

It forms white crystals, has a melting point of 253°–256° C. and its solubility amounts to 0.0123 gram in 100 cc. of water at 37° C. It has been used in the treatment of infections with all kinds of Gram-positive and Gram-negative bacteria, and proved to be a highly effective therapeutic agent in combating such infections. One disadvantage of sulfadiazine consists in its low solubility in water. In order to obtain solutions of higher concentration, alkali must be present in the solution, and upon adjusting the solutions to the physiological pH, sulfadiazine is precipitated from such solutions.

The main object of the present invention is to provide new compounds of sulfadiazine which, upon being dissolved, form stable aqueous solutions of a physiologically applicable pH.

Another object of our present invention is to form compounds of the above mentioned type which, in comparison with sulfadiazine, show a decreased toxicity and an increased therapeutic index.

More specifically, the object of the invention is to provide a compound comprising sulfadiazine and sodium salicylate, said compound yielding an aqueous solution of a physiologically applicable pH.

Other objects and the advantages of our invention will appear from the appended claims and the following specification which describes, by way of example, some preferred embodiments of the invention.

According to the preferred embodiment of this invention 1 mol of sulfadiazine and 2 mols of sodium salicylate are dissolved in hot water in the presence of sodium phosphate $$(Na_3PO_4.12H_2O)$$

and $NaH_2PO_4.H_2O$ is added to the solution until the desired pH is obtained. The solution thus formed is evaporated under vacuum to obtain the compound in the form of a white powder. Instead of using sodium salicylate as a starting material, salicylic acid and NaOH may be used and the pH of this solution may be adjusted by the addition of $H_3PO_4$. Adjustment of the pH may also be effected by the addition of other acids or acid compounds such as hydrochloric acid, lactic acid or the like.

*Example 1.*—25.0 g. of sulfadiazine ($\frac{1}{10}$ mol), 32.0 g. of sodium salicylate ($\frac{2}{10}$ mol) and 25–30 g. of $Na_3PO_4.12H_2O$ are dissolved in a sufficient amount, for example 3200 to 4000 g. of boiling water. The pH of the solution is adjusted to 7.5–8.2 by the addition of 5–6 g. of $NaH_2PO_4.H_2O$, and the solution is then completely evaporated under vacuum. The white powder thus obtained is soluble in water of 35° C. A solution containing 1% of this complex compound is stable, may be sterilized by heat and remains clear at ordinary room temperature of 18°–25° C.

*Example 2.*—25.0 g. of sulfadiazine ($\frac{1}{10}$ mol), 27.6 g. of salicylic acid ($\frac{2}{10}$ mol), and 12.0 g. of NaOH are boiled with 2500 g. of water until a clear solution is formed. The pH of the solution is adjusted by the addition of the necessary amount of $H_3PO_4$, dissolved in water and the solution is then further treated as described in Example 1.

*Example 3.*—$\frac{1}{10}$ mol of sulfadiazine, $\frac{2}{10}$ mol of sodium salicylate and 25 g. of $Na_3PO_4.12H_2O$ are heated in 3000 cc. of water until a clear solution is formed. In this solution one mol of ascorbic acid is dissolved and sufficient $H_3PO_4$, dissolved in water, is added to obtain a pH of 7.7. This solution is evaporated in vacuo. The crystals are dried in vacuo at ordinary temperature.

It has been found that in the compounds according to the present invention the toxicity of the sulfadiazine is decreased and its efficiency, expressed by the therapeutic index, is increased. The aqueous solutions of our new compounds may be administered by injection or per os.

It will be apparent to those skilled in the art that the present invention is not limited to the specific steps and details described above and may be carried out with various modifications without departing from the spirit and scope of the invention as defined in the appended claims. For example, instead of sodium salicylate, potassium salicylate, and instead of sodium phosphates, the corresponding potassium phosphates may be used. Instead of $Na_3PO_4$, other suitable compounds such as sodium acetate may be used.

What is claimed is:

1. A water-soluble composition of sulfadiazine and alkali salicylate, said alkali salicylate being present in an amount of 2 mols for 1 mol of sulfadiazine.

2. An injectable aqueous solution containing the composition according to claim 1 in solution.

FRITZ MEYER.
CARL NEUBERG.

REFERENCES CITED

The following references are of record in the file of this patent:

UNITED STATES PATENTS

| Number | Name | Date |
|---|---|---|
| 2,230,875 | Winnek | Feb. 4, 1941 |

FOREIGN PATENTS

| Number | Country | Date |
|---|---|---|
| 490,350 | Great Britain | Aug. 12, 1938 |
| 114,821 | Australia | May 21, 1942 |

OTHER REFERENCES

Proc. Soc. Exptl. Biol. and Med., June 1943, pages 142 to 145.